United States Patent [19]

Masterson

[11] 3,731,404
[45] May 8, 1973

[54] TESTING FORM AND SYSTEM

[76] Inventor: Albert C. Masterson, 1048 Montview Road, Fort Collins, Colo. 80521

[22] Filed: Apr. 19, 1971

[21] Appl. No.: 135,364

[52] U.S. Cl. ..................................35/48 R, 35/9 G
[51] Int. Cl. ................................................G09b 1/00
[58] Field of Search ..................35/9 GH, 48 R, 48.1, 35/66; 40/310; 283/6

[56] References Cited

UNITED STATES PATENTS

| | | | |
|---|---|---|---|
| 1,009,078 | 11/1911 | MacDonald | 40/310 |
| 1,866,545 | 7/1932 | Cohen | 35/9 G |
| 2,516,727 | 7/1950 | Schultheiss | 35/66 |
| 2,929,931 | 3/1960 | Richter et al. | 35/9 G |
| 3,327,406 | 7/1967 | Baker | 35/9 G |
| 3,451,143 | 6/1969 | Thomas et al. | 35/48 R |
| 3,508,344 | 3/1970 | Thomas | 35/9 G |

*Primary Examiner*—Robert W. Michell
*Assistant Examiner*—J. H. Wolff
*Attorney*—Drake, Crandell & Batchelder

[57] ABSTRACT

A testing form and system for testing the ability of a person to comprehend and carry out or follow written instructions. A test problem or set of instructions is printed on a photosensitive surface, preferably by a contact printing technique, and the form is then light sealed, as by placing it in an opaque envelope or detachably bonding a layer of opaque material over the photosensitive surface. The photosensitive characteristics of the surface on which the problem is printed are such that when the light shielding material is removed by the person being tested, the consequent exposure of the surface to light will cause the problem to become illegible within a predetermined period of time. Where the problem is printed by a contact printing technique, the period of legibility of the printed problem upon exposure to light may be varied by varying the printing exposure time.

1 Claim, No Drawings

TESTING FORM AND SYSTEM

BACKGROUND OF THE INVENTION

The present invention is especially directed to a testing system which can be employed to test, under standardized conditions, the ability of a person to comprehend written instruction and to establish a scale by which this ability may be comparatively rated. One of many applications where the reading comprehension of a person is of interest is in that of preemployment testing of job applicants. The standard printed test form is unsatisfactory for this purpose because the printed problem or set of instructions is before the person being tested and it is not possible to accurately determine a division of the time spent on the problem between the time required for the person being tested to comprehend the problem and the time spent in solving the problem or carrying out the instructions. While this problem is in some instances overcome by having the test supervisor pick up the printed problem after the elapse of a set period of time, this procedure does not lend itself to situations where several persons are being tested simultaneously or where several different problems are involved.

The present invention therefore is directed to a testing procedure which does not require active supervision and under which written material in the nature of instructions or a problem is available to the person being tested for only a selected set period of time.

In accordance with the present invention, a test form is prepared by printing a problem on a photosensitive surface whose characteristics are such that the shade of the surface will change progressively upon exposure of the surface to light. The term "shade" as employed in this specification and in the appended claims refers to the relative darkness or lightness of either a chromatic or achromatic color and is not restricted to relative degrees of blackness. The printing of the problem or instructional material is done under controlled light conditions and the printed surface is then light sealed, as by placing it in an opaque envelope or by detachably bonding an opaque sheet over the printed surface.

Instructions as to the manner in which the form is to be used may be printed on an exposed surface of the light sealing element, and in some situations further instructions or material might be printed on the interside of the light sealing element to become available to the person being tested only when the light seal is removed.

Testing is conducted by handing the sealed test form to the person to be tested in a test area having controlled lighting conditions. The person being tested is instructed, either orally or by printed material on the exterior of the sealed form how to remove the seal and is advised that upon removal of the light seal the problem or instructions will remain legible only for a set period of time. Upon removal of the light seal and the consequent exposure of the photosensitive surface upon which the problem is printed to the controlled lighting conditions of the test area, the photosensitive surface upon which the problem is printed will change progressively in shade until, after a predetermined period of time, the degree of contrast between the printing and background on the photosensitive surface diminishes to a point where the printing is no longer legible.

In one embodiment of the invention, printing of the test problem or set of instructions on a photosensitive surface may be accomplished by employing a contact printing technique on commercially available photographic paper. One example of a commercially available paper suitable for this purpose is that manufactured and sold by Eastman Kodak Company as its PANALURE paper. This paper, when exposed to light, progressively darkens in accordance with the time of exposure and the intensity of the incident light. The specific shade may be said to correspond generally to the total "quantity" of light — i.e., intensity times time. With Kodak PANALURE paper, it has been found that a visible image can be produced by exposure at a distance of 18 inches from a photoflood bulb for a period of two and one-half minutes. This image is visible without any treatment or development of the paper and is produced solely by the foregoing exposure. Upon removal of the negative and exposure to the same lighting conditions, the image printed by the foregoing process merges into the background to a point where it becomes illegible approximately three minutes after exposure of the background.

It should be pointed out that in the foregoing example, a completely dry process is involved — that is the changing of the shade of the paper is due solely to exposure to light and not to any chemical reaction between the treated paper and developer or fixer solutions.

The image printed in the specific example outlined above is of what might be termed a minimum clearly legible contrast. A longer period of exposure will, of course, result in a greater degree of contrast between the printed image and background. It has been found that where longer exposure time under the lighting conditions described above are employed, the time period over which the printed image will remain legible upon exposure of the background to the same lighting conditions is substantially equal to the time of printing exposure.

Although the change in shading produced on dry photosensitive photographic paper is a function of both the time of exposure and intensity of the incident light, variation in intensity does not appear to produce a directly proportional variation in shading. In the case of the PANALURE paper referred to above, very little difference in shading can be detected between papers exposed respectively to 25 and 50 foot candles for equal periods of time.

The rate at which the photosensitive paper changes in shade upon exposure to light appears to progressively decrease with lengthening time of exposure. In other words, a greater change of shading occurs during the initial period of exposure to light than will occur in a corresponding period latter on. It is this characteristic which apparently enables the shade of the background to "catch up" to that of the printing in a period of time approximately equal to the initial printing exposure time where printing and subsequent exposure are under the same lighting conditions.

In the practice of the present invention, a problem is formulated which typically may include a set of facts, figures or illustrations and a set of instructions. A determination is then made as to how long this information is to be available to the person being tested. The problem is then laid out in printed form and a photographic negative is made by conventional techniques.

The negative thus made is placed in contact with the sensitized surface of an unexposed sheet of conventional photographic printing paper, such as the Kodak PANALURE paper referred to above. A contact print is then made by exposing the sensitized paper through the negative to light of a selected intensity for a selected period of time. Desirably, the intensity of the light under which this exposure is made is chosen to match that of the lighting under which the test will be conducted. Where the exposure is made under the same lighting conditions as will exist during the testing, the time period of exposure to make the contact print of the problem is regulated to be equal to the time period during which the information contained in the problem is to be available to the person being tested. At the conclusion of the desired time of exposure, the exposed contact print is then light sealed either by inserting and sealing it within an opaque envelope or by detachably bonding a layer of opaque paper along its periphery to overlie the exposed surface of the photographic paper.

When the photographic paper is subsequently removed from the envelope by the person taking the test, the consequent exposure of the photosensitive surface to light will cause the background area on which the problem is printed to progressively darken, steadily reducing the contrast between the printed characters and background until the contrast is reduced to a point such that the printed characters are no longer legible. The time period for the characters to become illegible is equal to the original time period of exposure employed in printing the problem where the lighting conditions in the room where the test is being taken are the same as those under which the problem was originally printed.

The rate at which highly sensitive photographic papers, such as Kodak PANALURE paper, darken upon exposure to light is dependent both upon the intensity of the incident light and the time period of exposure. This relationship presents the possibility of accelerating the printing process by employing a higher intensity light than will be available at the test area for a shorter period of time than is to be allotted to the person taking the test. However, the relationship between time, light intensity and degree of shading is a rather complex one which should be determined experimentally for each set of conditions.

While one embodiment of the invention has been described, it will be apparent to those skilled in the art that the disclosed embodiment may be modified. Therefore, the foregoing description is to be considered exemplary rather than limiting, and the true scope of the invention is that defined in the following claims.

I claim

1. A form for testing the level of comprehension ability of a person, comprising:

a sheet of material exhibiting a photosensitivity characteristic such that a surface of said sheet progressively changes, upon exposure to light of predetermined intensity, from a first shade to a second shade in a predetermined period of time equal to a time interval preselected as a limit for the achievement of comprehension by the person;

a test problem visibly displayed on said surface as an image photographically created initially to exhibit said second shade while the remainder of said surface is of said first shade;

and manually-removable light-opaque means shieldingly disposed over said surface with said image being of said second shade and the remainder of said surface being of said first shade, subsequent removal of said light-opaque means and exposure of said surface to light of said intensity initiating change in said remainder of said surface from said first shade to said second shade in said predetermined time period.

* * * * *